United States Patent
Fulbert et al.

[11] Patent Number: 5,963,578
[45] Date of Patent: Oct. 5, 1999

[54] MICROLASER CAVITY AND MICROLASER WITH MODE SELECTION AND MANUFACTURING PROCESSES

[75] Inventors: Laurent Fulbert, Voiron; Marc Rabarot, Seyssinet, both of France

[73] Assignee: Commissariat a l'Energie Atomique, Paris, France

[21] Appl. No.: 08/893,176

[22] Filed: Jul. 15, 1997

[30] Foreign Application Priority Data

Jul. 26, 1996 [FR] France ................................. 96 09436

[51] Int. Cl.⁶ .......................................................... H01S 3/08
[52] U.S. Cl. ............................ 372/101; 372/99; 372/103; 372/19
[58] Field of Search ........................ 372/9, 18, 19, 372/21, 22, 99, 101, 103, 66, 98

[56] References Cited

U.S. PATENT DOCUMENTS

| | | | |
|---|---|---|---|
| 4,519,708 | 5/1985 | Perlmutter et al. | 356/350 |
| 4,797,893 | 1/1989 | Dixon | 372/19 |
| 4,903,271 | 2/1990 | Yasui et al. | 372/9 |
| 5,343,487 | 8/1994 | Scott et al. | 372/46 |
| 5,414,724 | 5/1995 | Zhou et al. | 372/10 |
| 5,461,637 | 10/1995 | Mooradian et al. | 372/92 |
| 5,495,494 | 2/1996 | Molva et al. | 372/98 |
| 5,539,765 | 7/1996 | Sibbett et al. | 372/92 |
| 5,802,086 | 9/1998 | Hargis et al. | 372/22 |

FOREIGN PATENT DOCUMENTS

| | | |
|---|---|---|
| 0 476 857 | 3/1992 | European Pat. Off. . |
| 0 694 361 | 1/1996 | European Pat. Off. . |
| 0 724 316 | 7/1996 | European Pat. Off. . |
| 0 742 614 | 11/1996 | European Pat. Off. . |
| 0 742 615 | 11/1996 | European Pat. Off. . |

*Primary Examiner*—Hemang Sanghavi
*Attorney, Agent, or Firm*—Oblon, Spivak, McClelland, Maier & Neustadt, P.C.

[57] ABSTRACT

A microlaser cavity including an entry mirror, an exit mirror (36), an active laser medium. Also included is a mechanism for selecting cavity transverse modes when the cavity is pumped, in order to enable oscillation of one or several cavity transverse modes and to prevent oscillation of other cavity transverse modes.

35 Claims, 7 Drawing Sheets

MICROLASER CAVITY AND MICROLASER WITH MODE SELECTION AND MANUFACTURING PROCESSES

TECHNICAL FIELDS AND PRIOR ART

This invention relates to the field of microlasers or microlaser cavities in which the active medium is solid.

There are many applications for microlasers in a wide variety of fields such as the automobile industry, the environment, scientific instrumentation and telemetry.

The structure of a microlaser is like a stack of multilayers.

The active laser medium is composed of thin material (between 150 and 1000 $\mu$m) with a small area (a few mm$^2$), on which dielectric cavity mirrors are deposited directly. This active medium may be pumped by a laser diode III–V which is either directly hybridized on the microlaser or is coupled to the microlaser by an optical fiber. The possibility of collective manufacturing using microelectronic equipment enables mass production of these microlasers at very low cost.

Figure 1:
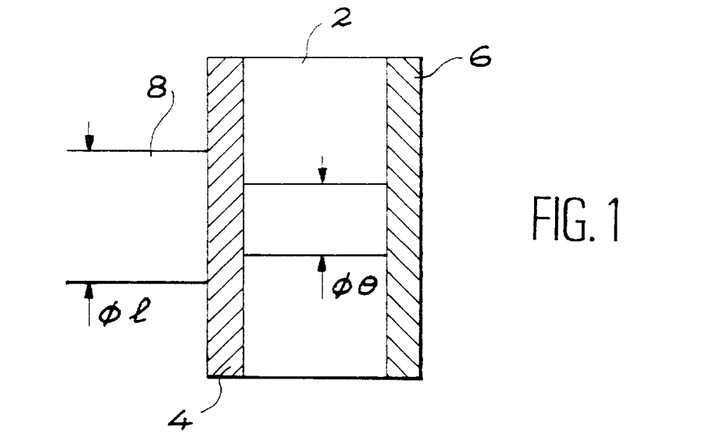
FIGS. 1 and 2 already described above have microlaser cavities according to prior art.
Figure 2:
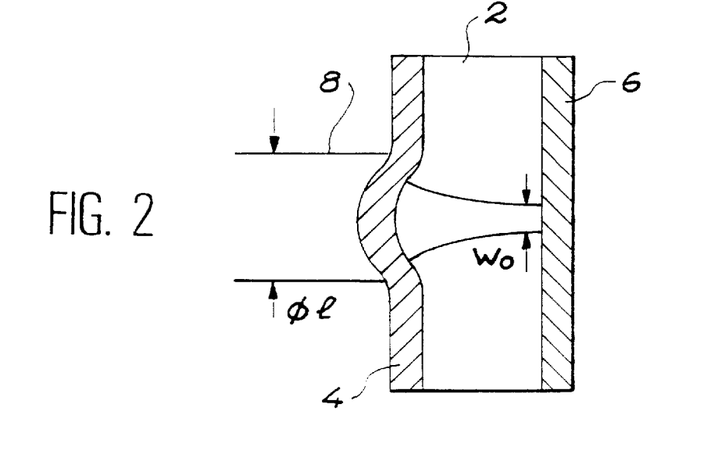

FIGS. 1 and 2 attached represent microlaser structures that have now become conventional. The structure in FIG. 1 corresponds to a plane-plane microlaser cavity, the structure in FIG. 2 corresponds to a plane-concave microlaser cavity. Concave-concave microlaser cavities can also be made. In all cases, the basic structure consists of an active laser medium 2, the microlaser cavity being limited by an entry mirror 4 and an exit mirror 6. These cavities can also incorporate other intracavity elements, for example such as a saturable absorbent material deposited in the form of thin layers as described in documents EP-653 824 (U.S. Pat. No. 5,495,494).

A number of transverse or longitudinal modes may oscillate inside this type of laser cavity, regardless of its structure. These modes resonate at different frequencies and the presence of several modes in the cavity is the result of spectral spreading of the beam emitted by the microlaser and wider divergence.

The thickness of the active laser medium 2 or the microlaser cavity can be calculated so that only one longitudinal mode is obtained; this calculation and examples are given in document EP-653 824.

It was mentioned above that laser diodes form a convenient means of pumping a microlaser cavity. However, laser diode beams have poor geometric characteristics and cannot be easily focused in a small area within a fundamental mode of the microlaser cavity. Thus in FIGS. 1 and 2, reference 8 shows the pumping beam output from a laser diode with a diameter $\phi_l$ whereas the fundamental mode of the cavity and has a diameter $\phi_0$ (FIG. 1), and a diameter equal to at least $w_0$. (FIG. 2). Consequently, the pumping beam is usually absorbed in areas by encouraging transverse modes other than the fundamental mode of the microlaser cavity. The gain created in the cavity due to pumping encourages the appearance of higher order transverse modes in the laser beam emitted by the microlaser cavity.

This phenomenon is more sensitive in stable cavities, particularly plane-concave cavities (FIG. 2), than in a plane-plane cavity (FIG. 1), due to the fact that the size of the fundamental mode in the first case is smaller than in the second case. Similarly, the proportional loss of higher modes introduced by the cavity geometry is weaker in the case of a plane-concave cavity than in the case of a plane-plane cavity. However in all cases, the appearance of transverse modes degrades the spatial quality and the spectral quality of the microlaser beam. In general, when a plane-concave microlaser is pumped by a power diode, the thresholds at which transverse modes occur are close to the threshold at which the fundamental mode appears. Therefore, these types of lasers cannot have transverse single mode operation, particularly when high pumping powers are involved and when the pumping beam creates gain on higher order transverse modes.

Consequently, in principle, microlasers can operate under transverse single mode conditions, but not in the case in which the pumping beam is large compared with the laser beam (for example the case of stable cavities) or when the pump power is very high.

In general, there are no known microlasers with a structure in which some modes in the cavity can be brought into resonance, with other modes being inhibited.

DESCRIPTION OF THE INVENTION

This invention is intended to solve these problems.

Consequently, its objective is a monolithic microlaser cavity with an entry mirror, an exit mirror, an active laser medium, and means of selecting cavity transverse modes when the cavity is pumped, so that one or several transverse modes of the cavity can be oscillated, and oscillation of other transverse modes of the cavity can be prevented.

The means of selecting cavity transverse modes may comprise at least one intracavity diaphragm with an annular or circular aperture in order to enable oscillation of one, or several, cavity transverse modes and to prevent oscillation of other cavity transverse modes. According to one variant, the diaphragm may be placed on one of the cavity mirrors.

Another objective of the invention is a monolithic microlaser cavity with an entry mirror, an exit mirror, an active laser medium, at least one of the two mirrors being engraved, or deposited, in order to enable (or with a shape enabling) the oscillation of one or several cavity transverse modes, and to prevent (or preventing) the oscillation of other cavity transverse modes.

These structures can reduce the number of transverse modes and encourage one, or several, particular operating modes of the cavity. In all cases, the threshold at which some transverse modes appear is increased, and others are inhibited.

Furthermore, the above structures are compatible with collective manufacturing methods, using microelectronic means used for the production of microlasers.

In all cases, a particularly useful embodiment is that in which the fundamental mode may oscillate and other modes are prevented from oscillating. A microlaser beam with a good spectral and spatial quality is thus obtained. In the case of a plane-plane microlaser cavity, these results can be obtained by using an entry or exit micromirror in the form of disk with a diameter calculated to suit a given pump power so as to increase losses on higher order modes and to prevent the laser effect on these modes. If the cavity is stabilized (with a plane-concave cavity), it is always possible to make a plane disk shaped mirror with a diameter calculated as above, in order to obtain single mode operation in the fundamental mode. The diameter of the fundamental mode on the plane mirror is given by the formula $$\varphi = 2\sqrt{\frac{\lambda}{\pi n} \sqrt{R-L}}$$

where λ is the wave length of the microlaser fundamental mode, n is the index of the intracavity material, L is the length of the microlaser cavity and R is the radius of curvature of the concave mirror. According to one variant, the concave mirror has a diameter calculated as above. In the latter case, the fundamental mode at the concave mirror has a diameter $$\varphi = 2\sqrt{\frac{\lambda}{\pi n} \sqrt{R-L}} \sqrt{\frac{R}{R-L}},$$

using the same notation as above.

Another purpose of the invention is a process for making a monolithic microlaser cavity comprising a step to make the means of selecting cavity transverse modes.

More precisely, this step may include embodiment of a diaphragm with a circular or annular aperture, or with a shape that enables the oscillation of one or several cavity mode(s), while preventing oscillation of other cavity modes. This type of diaphragm may be placed inside the microlaser cavity, on one of the cavity mirrors.

It is also possible to engrave one of the microlaser cavity entry and exit mirrors. For example, the engraving may be done by ionic machining or by reactive ionic engraving, or by etching after the formation of a mask on the mirror. According to one variant, engraving may be done by abrasion.

Instead of engraving one or several of the mirrors, it is possible to carry out a selective depositing step on at least one of the cavity mirrors, the deposit taking place solely in areas enabling reflection of one or several cavity modes, the other cavity modes not being reflectable by said mirror. This deposit may take place after production of a mask, and then etching the mask in deposit areas.

Another objective of the invention is a microlaser with a microlaser cavity such as that described above, and microlaser cavity pumping means.

BRIEF DESCRIPTION OF THE FIGURES

Other characteristics and advantages of the invention will become clearer from the following description given for purely illustrative purposes and in no way restrictive, with reference to the figures in the appendix, in which.

DETAILED DESCRIPTION OF EMBODIMENTS OF THE INVENTION

In the case of an unstable cavity, such as the plane-plane cavity in FIG. 1, the fundamental mode has a diameter $\phi_0$ of the order of several tens of micrometers, for example 60 μm. The exact size may be determined using a beam analyzer and a calibrated camera.

Still in the case of a plane-plane cavity, higher order transverse modes have a diameter about 1.5 times greater than the fundamental mode.

In the case of a stable cavity, particularly a plane-concave cavity as shown in FIG. 2, the diameter $W_0$ of the fundamental mode at the plane mirror 6 is given by $$W_0 = 2\sqrt{\frac{\lambda}{\pi n} \sqrt{L(R-L)}},$$

where λ is the wave length of the fundamental mode, n is the index of the intracavity material (when there are several intracavity elements, the fundamental mode diameter is calculated allowing for propagation in the various media), L is the length of the microlaser cavity and R is the radius of curvature of the concave mirror.

At the concave mirror, the mode diameter is equal to:

$$W = W_0 \sqrt{\frac{R}{R-L}}.$$

Still in the case of a plane-concave structure, the diameter of higher order transverse modes is about 1.5 times greater than the fundamental mode.

Therefore in all cases, regardless of the geometry of the cavity, the diameter of each mode is clearly determined. The invention can be used to make a "diaphragm", the geometric characteristics of which are such that said diaphragm allows one of several cavity modes only to pass, or sufficiently degrades the characteristics of the cavity for higher order modes.

In the case of the fundamental mode, it is possible to make a diaphragm (for example metallic) placed inside the cavity. Preferably, the diaphragm is placed on either the entry or the exit mirror, this diaphragm having an aperture, for example circular, the size of which is calculated as above.

Figure 3:
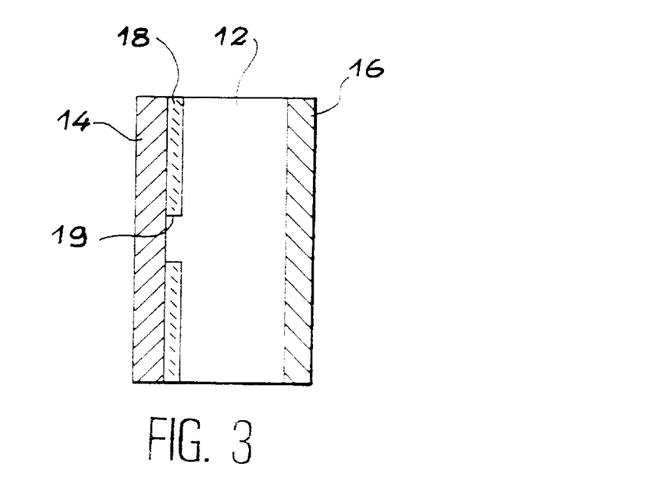
FIGS. 3 and 4 represent variants of a first embodiment of a microlaser cavity according to the invention.

Thus in FIG. 3, apart from an active medium 12 (and possibly other intracavity components) a microlaser comprises cavity entry and exit mirrors 14 and 16, and a diaphragm 18 (intracavity diaphragm, FIG. 3). Thus, only the fundamental mode can be oscillated inside the microlaser cavity. The result is a laser beam of higher quality; its spatial and spectral characteristics depend solely on the spatial and spectral characteristics of the fundamental mode.

Figure 4:
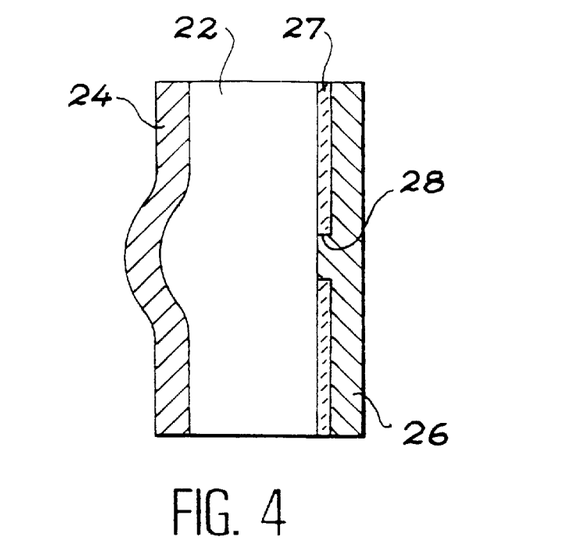

FIG. 4 shows the case of a stable, plane-concave microlaser cavity. This cavity comprises an active medium 22 (and possibly other intracavity components), and the cavity entry mirror 24 and exit mirror 26. The cavity comprises an intracavity diaphragm 27 (FIG. 4). In the case in FIG. 4, the diaphragm 27 has an aperture 28 with a diameter calculated as above.

According to one variant not shown in the figures, an intracavity diaphragm may also be deposited on the inside of the mirror 24, with the same geometric aperture characteristics calculated as above.

Figure 5A:
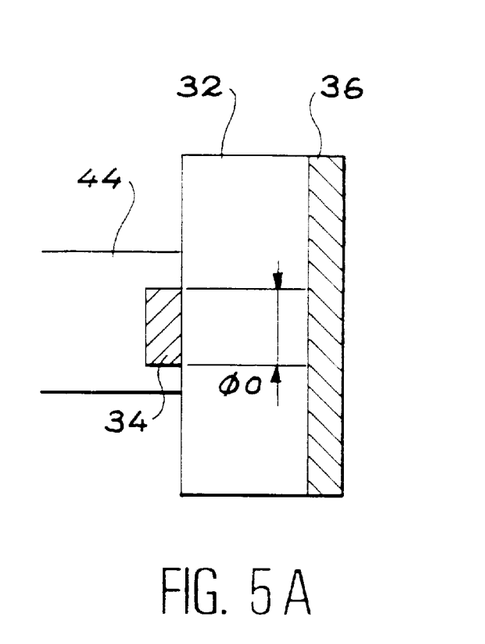
FIGS. 5A and 5B represent another embodiment of the invention for a plane-plane cavity.
Figure 5B:
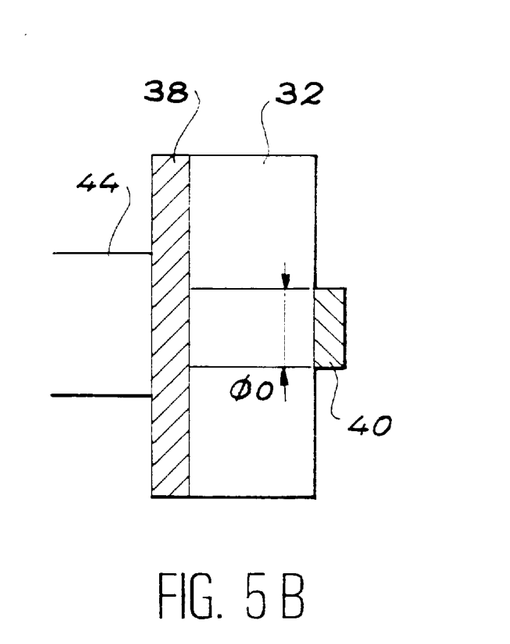
Figure 6:
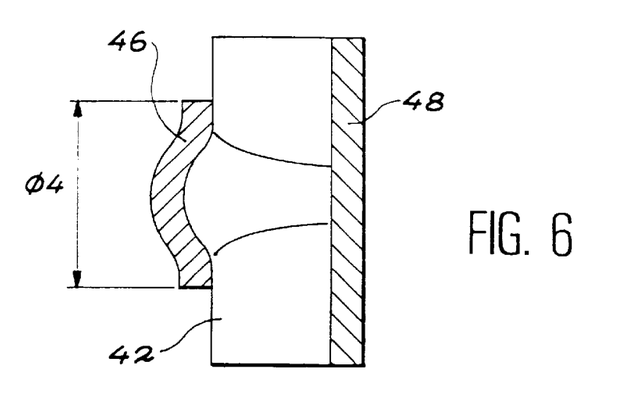
FIG. 6 represents a variant of an embodiment of the invention for a plane-concave cavity.

Another embodiment of the invention will be described with reference to FIGS. 5A to 6. In this embodiment, the shape of one of the mirrors in the cavity will be used for mode selection. Thus in FIGS. 5A and 5B, the microlaser comprises the active laser medium 32 (and possibly other intracavity elements of the non-linear type), and also entry mirrors 34, 38 and exit mirrors 36, 40, one of which may for example be in the form of a disk with a diameter calculated as above. The pumping beam 44, for example obtained with a laser diode, prevents oscillation of transverse modes of higher order than the fundamental mode within the cavity. Only the fundamental mode will be able to oscillate between two mirrors, since one of the mirrors has limited lateral extension.

For example, the concave mirror 46 in the case of a plane-concave cavity (FIG. 6), may have an extension limited to a value or diameter calculated as above. According to a variant, the lateral extension of the exit mirror 48 is limited.

The examples of microlaser cavity structures given above in relation to FIGS. 3A to 6 keep only the fundamental mode of the microlaser cavity and eliminate all other transverse modes. By using an appropriate shape for the mode selection means, in other words the diaphragm or the cavity entry mirror or exit mirror, it is possible to select other transverse modes, for example by eliminating the fundamental mode.

Regardless of the embodiment being considered, the active laser material comprises essentially a basic material doped with active laser ions.

The basic material may be chosen among one of the following crystalline materials: YAG ($Y_3Al_5O_{12}$), LMA ($LaMgAl_{11}O_{19}$), $YVO_4$, YSO, ($Y_2SiO_5$), YLF ($YLiF_4$) or $GDVO_4$, etc. Or it may be a type of glass. The criteria chosen for one or other of these materials are given in document EP-653 824 (document U.S. Pat. No. 5,495,494). This document also gives information about the choice of the thickness e of the active laser medium, particularly to obtain a laser emitting a single longitudinal mode; typically, the thickness of the active medium is of the order of:

750 $\mu$m for a YAG active medium,

500 $\mu$m for a $YVO_4$. active medium,

150 $\mu$m for an LMA active medium.

For doping ions, a neodymium (Nd) is usually chosen for a laser emission of around 1.06 $\mu$m. Alternatively, erbium (Er) or erbium-ytterbium (Er-Yb) codoping may be chosen for an emission of about 1.5 $\mu$m. For an emission of around 2 $\mu$m, thulium (Tm) or holmium (Ho), or thulium-holmium codoping will be chosen. Doping with ytterbium alone can give an emission of 1.03 $\mu$m in the YAG.

Figure 7:
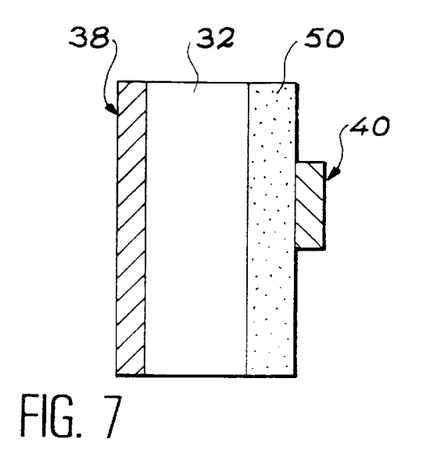
FIGS. 7 to 9 show microlaser cavities according to the invention, with a active laser medium and other intracavity elements.

There may also be other elements inside the microlaser cavity. As shown in FIG. 7, it may be a saturable absorbing element 50. It is particularly advantageous if the saturable absorbent is a thin layer of saturable absorbing material deposited directly on the solid active medium 32. One particularly advantageous embodiment for this saturable absorbing layer is epitaxy in the liquid phase. In this case, the layer 50 is composed of a basic material identical to the basic material for the solid active medium 32, doped with ions providing it with saturable absorbent properties, for example such as chromium ($Cr^{4+}$) or erbium ($Er^{3+}$) ions. It is thus possible to obtain a saturable absorbent layer deposited directly on the active laser medium, with a maximum thickness of 500 $\mu$m. All information necessary for the embodiment of this type of saturable absorbent layer is given in document EP-653 824 (U.S. Pat. No. 5,495,494). In particular, it is also possible to make a saturable absorbent deposit on each side of the active laser medium 32, and to obtain a microlaser cavity with two layers of saturable absorbent material deposited directly on the active laser medium.

It is also possible to make micromirrors 43 (FIG. 8) on the surface of the active laser material 32. Here again, all information necessary for making these microlenses is given in document EP-653 824. Micromirrors stabilize the microlaser cavity.

Figure 9:
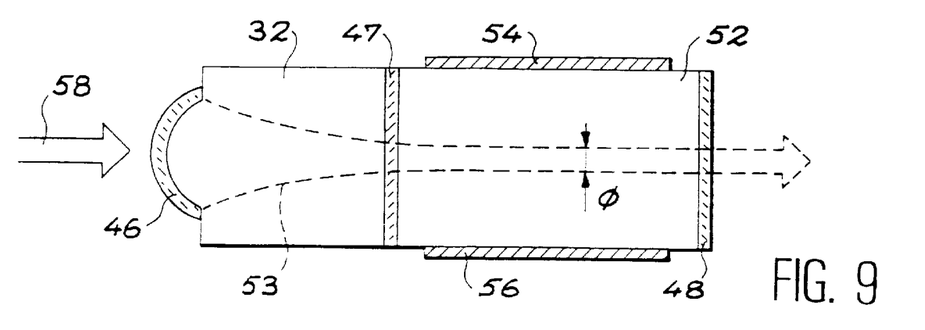

The active laser material on a microlaser cavity can also be associated with active triggering means located inside the cavity. This embodiment is illustrated in FIG. 9, in which reference 32 still shows the active laser medium, and the cavity is limited by entry mirror 46 and exit mirror 48. In fact, an intermediate mirror 47 delimits two cavities; a first resonating cavity is composed of the active laser medium, and a second resonating cavity by a material 52 with an index capable of varying as a function of external disturbances. This material 52 may be an electro-optical material such as an $LiTaO_3$, to which a potential difference is applied using two contact electrodes 54, 56. A pumping beam 58 is directed onto entry mirror 46. This mirror is concave and its dimensions enable it to select modes in accordance with the information given in the invention. This mirror also reduces the size of the laser beam within the electro-optical medium 52. Conditions for the radius of curvature of this mirror and the process for making this structure in FIG. 9 are given in document FR-A-95 00767 (U.S. Pat. No. 8,587,477).

Figure 8:
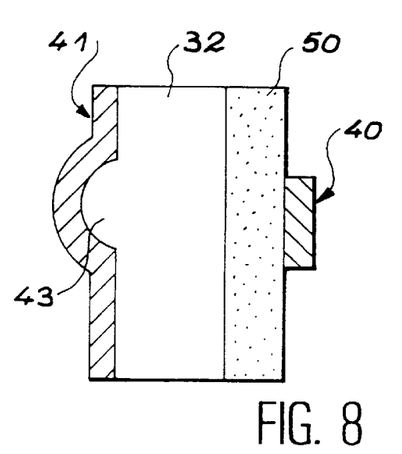

The examples in FIGS. 7 to 9 above concern structures in which modes are selected by the shape of mirrors. However, the presence of a saturable absorbent 50 (for example in the form of a thin layer), or micromirrors 43 or active cavity triggering means 52, is also compatible with an intracavity diaphragm 18, 27 (FIGS. 3, 4).

Finally, other intracavity elements may be provided such as optically non-linear elements (frequency doubler or tripler as described in FR-95 05650, or an optical parametric oscillator as described in FR 95 05654).

Figures 10, 11:
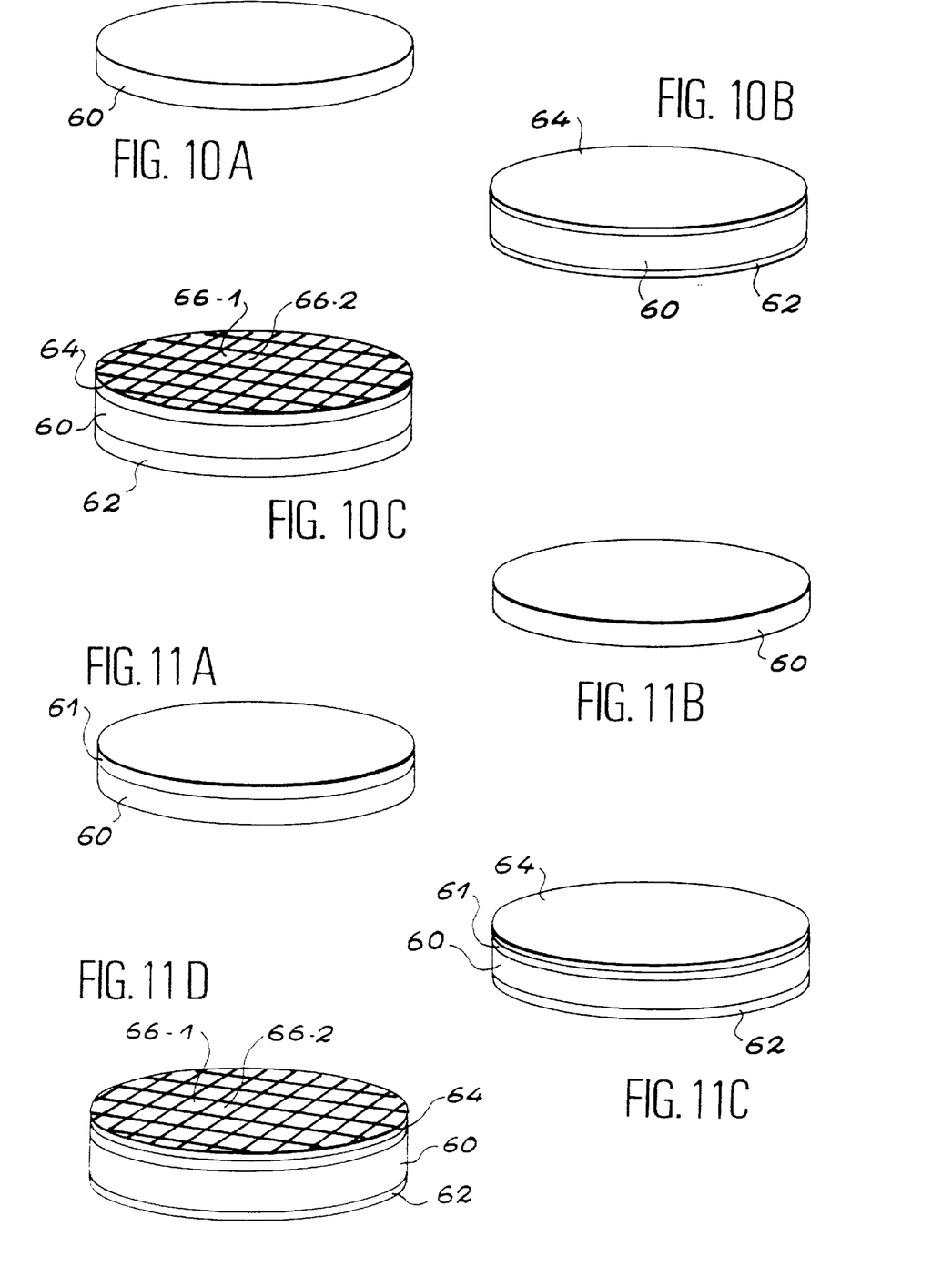
FIGS. 10A to 10C are steps in the process for the embodiment of a microlaser cavity according to the invention.
FIGS. 11A to 11D are steps in another process for the embodiment of a microlaser cavity according to the invention.

FIGS. 10A to 10C illustrate the steps in using this process to make a microlaser according to the invention, in which the transverse mode selection means are obtained by making the cavity entry and/or exit mirrors with an appropriate shape.

In a first step (FIG. 10A), an appropriate active laser material is chosen. The various possible materials have already been described above. A strip 60 of this material is cut out, for example with a thickness of between 0.5 and 5 mm. This strip is then polished on both sides.

As shown in FIG. 10B, the entry and exit mirror deposits 62 and 64 are then made on each side of the element obtained in the previous step. They are usually dichroic mirrors obtained by a commercially available deposit of dielectric multi-layers, well known to an expert in the subject. At least one of the mirrors is then engraved in order to make the entry or the exit mirror with the required shape so that it performs the mode selection function in accordance with the invention. This engraving step will be described in detail later. According to one variant, the mirrors are deposited selectively so that a reflecting surface is only deposited on areas intended to reflect one mode of the laser cavity. This variant will also be described later.

As shown in FIG. 10C, the multi-layer structure obtained is cut to obtain microlaser chips 660-1, 66-2, etc. This cutting may be done by a diamond saw (of the type used in microelectronics for cutting silicon chips). The chips obtained may have a crosssection of a few square millimeters.

An additional step may be included if it is required to make a network of micromirrors on either of the surfaces of the structure obtained. Preferably, the micromirrors will be engraved directly on the laser material, using techniques well known in microelectronics.

If modes are selected by an intracavity diaphragm (as shown in FIGS. 3 and 4), the steps in making a microlaser according to the invention are as follows (FIGS. 11A to 11D).

The first step, shown in FIG. 11B, is identical to the step described above with reference to FIG. 10A.

A deposit of a layer of material 61, for example a metallic material, is then made (FIG. 11A), which will be used to make the diaphragm. This deposit may be a selective deposit, for example so as to make apertures 19, 28 (FIGS. 3, 4) in each of the microlaser chips; in this case, the diaphragm is obtained immediately. Or a continuous layer 61 may be deposited which will then be engraved so as to form circular or annular apertures with the necessary shape.

The following steps (depositing dielectric layers to form mirrors, FIG. 11C; cutting elementary microlaser chips, FIG. 11D), are identical to the steps described above in relation to FIG. 10B and 10C.

In all cases, the structure obtained does not require that the various components are optically aligned at any time. Furthermore, it does not use any optical glue.

The cavity is preferably pumped by optical pumping. Thus, III–V laser diodes are particularly suitable for pumping a microlaser cavity.

Figure 12A:
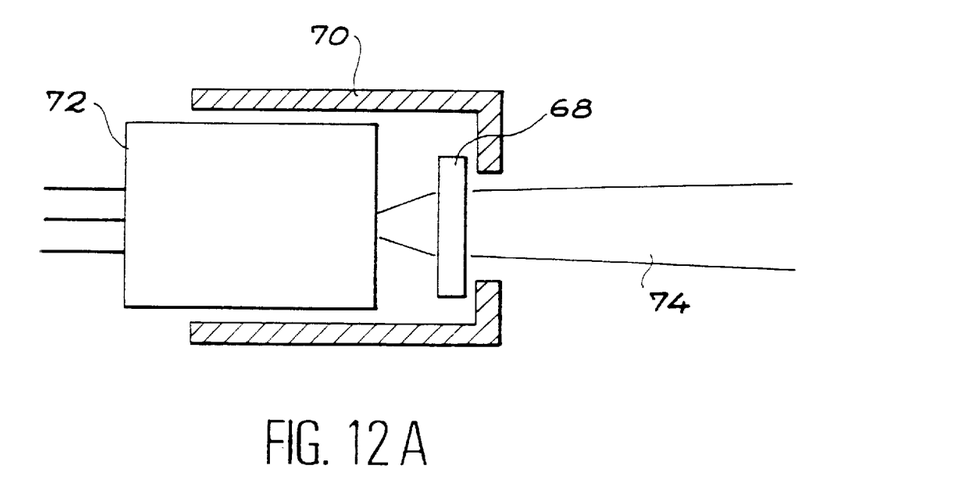
FIGS. 12A and 12B show microlasers according to the invention.
Figure 12B:
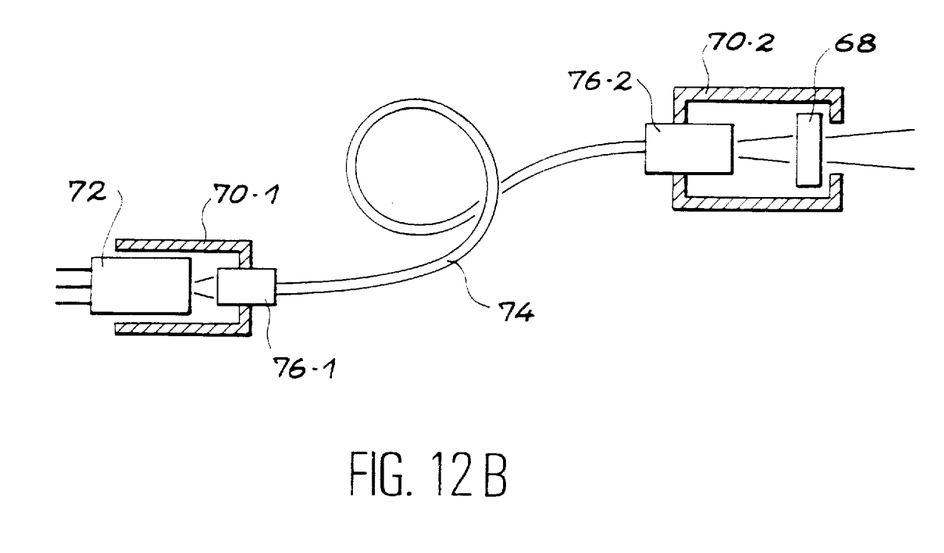

As shown in FIG. 12A, a microlaser cavity 68 obtained as described above may be installed in a mechanical box 70, also designed to contain the pumping laser diode 72. Reference 74 shows the continuous or pulsed laser beam obtained. According to another embodiment (FIG. 12B) two separate packages 70-1 and 70-2 may be provided; one to contain the microlaser cavity 68, the other to hold the pumping laser diode 72, the two packages being connected together by an optical fiber 74 using connectors 76-1 and 76-2 provided in each of the packages.

The pumping beam may have larger dimensions compared with the laser beam (this is the case for a diode pumped stabilized cavity), or the pumping power may be high; the structure of the microlaser according to the invention is capable of selecting only the required transverse mode(s).

We will now describe a detailed example embodiment of mirrors made by selective deposit, or engraving mirrors so that their shape is suitable for mode selection.

FIGS. 13A to 13E illustrate steps in the process in which a layer of mirrors 64 with diameter $\phi$ is deposited on the strip of active laser medium 60. The objective is to make a cavity capable of selecting one mode, for example the fundamental mode.

Figure 13A:
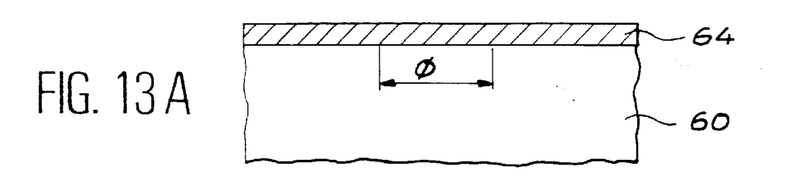
FIGS. 13A to 13E show the steps in engraving a mirror in order to make a microlaser cavity according to the invention.
Figure 13B:
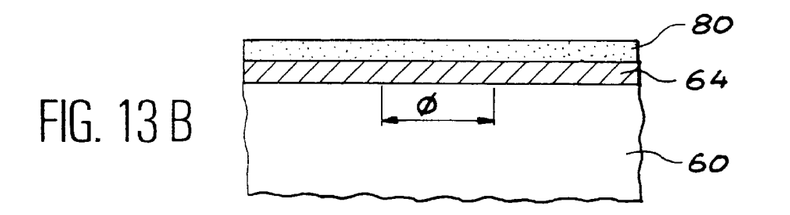
Figure 13C:
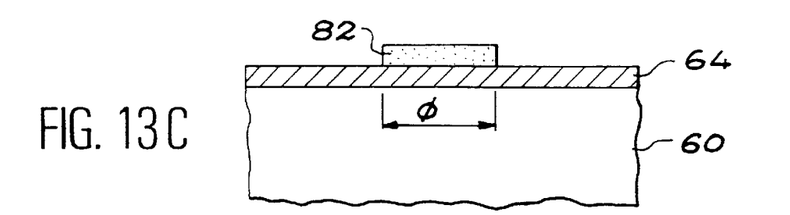
Figure 13D:
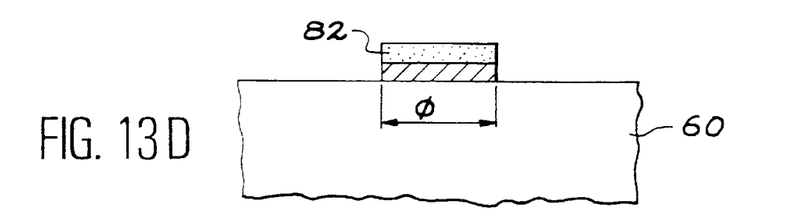
Figure 13E:
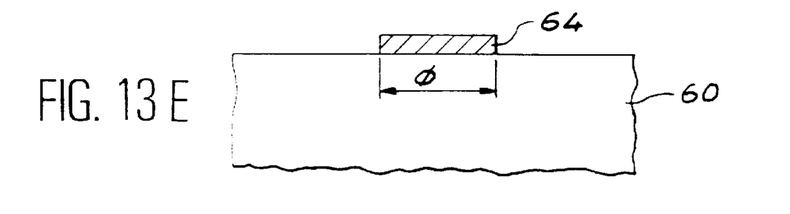

After depositing the mirror layer 64 (FIG. 13A), a layer of resin 80 is spread (FIG. 13B). By masking and photolithography, patches of resin 82 are revealed at locations at which the mirror 64 is to be kept (FIG. 13C). The mirror surface is then attacked either by ionic machining or by reactive ionic engraving, or by etching (FIG. 13D). The area in which the resin patch 82 is located will preserve the mirror, whereas the mirror will be attacked in other areas. The resin is then removed from the area in which the mirror 64 remained intact (FIG. 13E).

Figure 14:
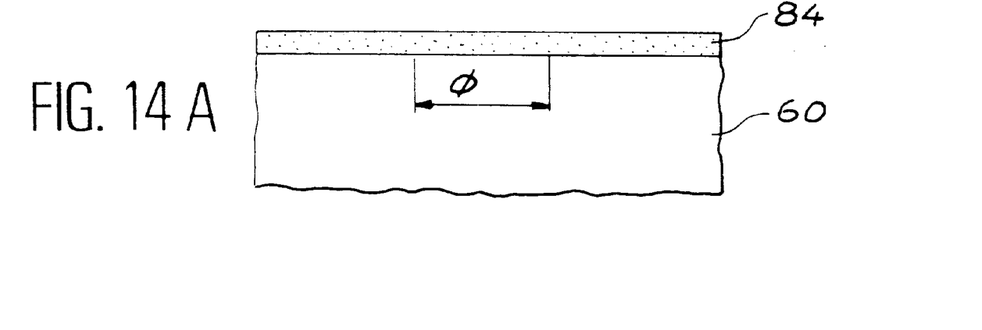
FIGS. 14A to 14D show the steps for making a selective deposit of a mirror in order to make a microlaser cavity according to the invention.

Steps in the process for selective deposit of mirrors are illustrated in FIGS. 14A to 14D. A layer of photosensitive resin 84 is spread on the strip of laser material 60 (FIG. 14A). This resin is then eliminated in areas 86 in which mirrors are to be deposited (FIG. 14B), by insolation followed by development and etching of the resin. As described above, the mirror layer 64 is then deposited as a thin layer. This gives a layer of mirrors only in the area in which the dimensions correspond to the dimensions of the diaphragm to be made to select a mode, for example the fundamental mode (FIG. 14C). The resin is then eliminated, for example using a "lift-off" process well known in microelectronics, outside the area external to the mirror treatment (FIG. 14D).

A third method not shown in the figures is to make a layer of mirrors on a strip of active laser material (as shown in FIG. 13A), and then mechanically attacking the mirrors after deposit by abrasion. The area in which mirrors are to be eliminated may be attacked by a rotating abrasive blade.

The structure of the microlithic microlaser cavity according to this invention can increase the spatial and spectral quality of a laser beam, by reducing the number of transfer modes and selecting some of them. In particular, it may be useful to give preference to $TEM_{00}$ operation, or operation in fundamental transverse mode. The structure of the microlaser cavity according to the invention can increase the threshold at which transverse modes appear, and even inhibit these transverse modes. Furthermore, the structure according to the invention is compatible with microlaser collective manufacturing processes. Techniques in the microelectronics field are used. Thus, mass production at very low cost is possible.

We claim:

1. A microlaser cavity, comprising:

an active laser medium;

an entry mirror on a first surface of the active laser medium;

an exit mirror on a second surface of the active laser medium; and an intracavity diaphragm, different from the entry mirror and the exit mirror, disposed within the microlaser cavity and configured to enable oscillation of one of several cavity modes and to prevent oscillation of other cavity modes.

2. The microlaser cavity according to claim 1, wherein the intracavity diaphragm comprises a metallic diaphragm.

3. The microlaser cavity according to claim 1, wherein the intracavity diaphragm is deposited on one of the entry mirror and the exit mirror.

4. The microlaser cavity according to claim 1, wherein the intracavity diaphragm comprises one of a circular shape and an annular shape.

5. The microlaser cavity according to claim 1, wherein the intracavity diaphragm is configured to enable oscillation of a fundamental mode of the microlaser cavity and to prevent other oscillation modes different than the fundamental mode.

6. The microlaser cavity according to claim 1, wherein the entry mirror comprises a concave shape and the exit mirror comprises a plane shape, thereby forming a plane-concave laser.

7. The microlaser cavity according to claim 1, wherein the entry mirror and the exit mirror comprise a plane shape, thereby forming a plane-plane laser.

8. The microlaser cavity according to claim 1, further comprising a saturable absorbent material disposed within said microlaser cavity.

9. A microlaser cavity, comprising:

an active laser medium;

a concave entry mirror on a first surface of the active laser medium; and a plane exit mirror on a second surface of the active laser medium, wherein at least one of the concave entry mirror and the plane exit mirror is configured to enable oscillation of one of several cavity modes and to prevent oscillation of other cavity modes, and wherein the plane exit mirror comprises a disk-shape having a diameter less than or equal to $$2\sqrt{\frac{\lambda}{\pi n}\sqrt{R-L}},$$

where $\lambda$ is a wavelength of a fundamental mode of the microlaser cavity, "n" is an index of the active laser medium, "L" is a length of the microlaser cavity, and "R" is a radius of curvature of the concave entry mirror.

10. The microlaser cavity according to claim 9, wherein the at least one of the concave entry mirror and the plane exit mirror is configured to enable oscillation of the fundamental mode of the microlaser cavity and to prevent other oscillation modes different than the fundamental mode.

11. A microlaser cavity, comprising:

an active laser medium;

an concave entry mirror on a first surface of the active laser medium; and an plane exit mirror on a second surface of the active laser medium, wherein at least one of the concave entry mirror and the plane exit mirror is configured to enable oscillation of one of several cavity modes and to prevent oscillation of other cavity modes, and wherein the concave entry mirror comprises a diameter less than or equal to $$2\sqrt{\frac{\lambda}{\pi n}\sqrt{R-L}}\sqrt{\frac{R}{R-L}},$$

where $\lambda$ is a wavelength of a fundamental mode of the microlaser cavity, "n" is an index of the active laser medium, "L" is a length of the microlaser cavity, and "R" is a radius of curvature of the concave entry mirror.

12. The microlaser cavity according to claim 11, wherein the at least one of the concave entry mirror and the plane exit mirror is configured to enable oscillation of the fundamental mode of the microlaser cavity and to prevent other oscillation modes different than the fundamental mode.

13. A method of making a microlaser cavity, comprising the steps of:

forming a concave entry mirror on a first surface of an active laser medium;

forming a plane exit mirror on a second surface of the active laser medium; and engraving at least one of the concave entry mirror and the plane exit mirror so as to enable oscillation of one of several cavity modes and to prevent oscillation of other cavity modes, wherein the engraving step engraves the plane exit mirror into a disk-shape having a diameter less than or equal to $$2\sqrt{\frac{\lambda}{\pi n}\sqrt{R-L}},$$

where $\lambda$ is a wavelength of a fundamental mode of the microlaser cavity, "n" is an index of the active laser medium, "L" is a length of the microlaser cavity, and "R" is a radius of curvature of the concave entry mirror.

14. The method according to claim 13, further comprising the step of:

forming a mask on the at least one of the concave entry mirror and the plane exit mirror prior to the engraving step.

15. The method according to claim 13, wherein the engraving step is performed by one of the steps of 1) ionic machining, 2) reactive ionic engraving, and 3) etching.

16. The method according to claim 13, wherein the engraving step is performed by the step of abrasion.

17. The method according to claim 13, wherein the engraving step engraves the at least one of the concave entry mirror and the plane exit mirror so as to enable oscillation of the fundamental mode of the microlaser cavity and to prevent oscillation of other cavity modes different than the fundamental mode.

18. A method of making a microlaser cavity, comprising the steps of:

forming a concave entry mirror on a first surface of an active laser medium;

forming a plane exit mirror on a second surface of the active laser medium; and engraving at least one of the concave entry mirror and the plane exit mirror so as to enable oscillation of one of several cavity modes and to prevent oscillation of other cavity modes, wherein the engraving step engraves the concave entry mirror to have a diameter less than or equal to $$2\sqrt{\frac{\lambda}{\pi n}\sqrt{R-L}}\sqrt{\frac{R}{R-L}},$$

where $\lambda$ is a wavelength of a fundamental mode of the microlaser cavity, "n" is an index of the active laser medium, "L" is a length of the microlaser cavity, and "R" is a radius of curvature of the concave entry mirror.

19. The method according to claim 18, further comprising the step of:

forming a mask on the at least one of the concave entry mirror and the plane exit mirror prior to the engraving step.

20. The method according to claim 18, wherein the engraving step is performed by one of the steps of 1) ionic machining, 2) reactive ionic engraving, and 3) etching.

21. The method according to claim 18, wherein the engraving step is performed by the step of abrasion.

22. The method according to claim 18, wherein the engraving step engraves the at least one of the concave entry mirror and the plane exit mirror so as to enable oscillation of the fundamental mode of the microlaser cavity and to prevent oscillation of other cavity modes different than the fundamental laser mode.

23. A method of making a microlaser cavity, comprising the steps of:

depositing a concave entry mirror on a first surface of an active laser medium; and depositing a plane exit mirror on a second surface of the active laser medium, wherein at least one of the steps of depositing the concave entry mirror and depositing the plane exit mirror selectively deposit only on areas of the active laser medium so as to enable oscillation of one of several cavity modes and to prevent oscillation of other cavity modes, and wherein the step of depositing the plane exit mirror selectively deposits the plane exit mirror to have a disk-shape with a diameter less than or equal to $$2\sqrt{\frac{\lambda}{\pi n}\sqrt{R-L}},$$

where $\lambda$ is a wavelength of a fundamental mode of the microlaser cavity, "n" is an index of the active laser medium, "L" is a length of the microlaser cavity, and "R" is a radius of curvature of the concave entry mirror.

24. The method according to claim 23, further comprising the step of:

forming a mask on at least one of the first surface and the second surface of the active laser medium prior to the steps of depositing the concave entry mirror and the plane exit mirror.

25. The method according to claim 23, wherein the steps of depositing the concave entry mirror and the plane exit mirror selectively deposit only on areas of the active laser medium so as to enable oscillation of the fundamental mode of the microlaser cavity and to prevent oscillation of other cavity modes different than the fundamental mode.

26. A method of making a microlaser cavity, comprising the steps of:

depositing a concave entry mirror on a first surface of an active laser medium; and depositing a plane exit mirror on a second surface of the active laser medium, wherein at least one of the steps of depositing the concave entry mirror and the plane exit mirror selectively deposit only on areas of the active laser medium so as to enable oscillation of one of several cavity modes and to prevent oscillation of other cavity modes, and wherein the step of depositing the concave entry mirror selectively deposits the concave entry mirror to have a diameter less than or equal to $$2\sqrt{\frac{\lambda}{\pi n}\sqrt{R-L}}\sqrt{\frac{R}{R-L}},$$

where $\lambda$ is a wavelength of a fundamental mode of the microlaser cavity, "n" is an index of the active laser medium, "L" is a length of the microlaser cavity, and "R" is a radius of curvature of the concave entry mirror.

27. The method according to claim 26, further comprising the step of:

forming a mask on at least one of the first surface and the second surface of the active laser medium prior to the steps of depositing the concave entry mirror and the plane exit mirror.

28. The method according to claim 26, wherein the steps of depositing the concave entry mirror and the plane exit mirror selectively deposit only on areas of the active laser medium so as to enable oscillation of the fundamental mode of the microlaser cavity and to prevent oscillation of other cavity modes different than the fundamental mode.

29. A method of making a microlaser cavity, comprising the steps of:

forming an entry mirror on a first surface of an active laser medium;

forming an exit mirror on a second surface of the active laser medium; and forming an intracavity diaphragm, different from the entry mirror and the exit mirror, the intracavity diaphragm disposed within the microlaser cavity and configured to enable oscillation of one of several cavity modes and to prevent oscillation of other cavity modes.

30. The microlaser cavity according to claim 29, wherein the step of forming the intracavity diaphragm comprises the step of depositing the intracavity diaphragm on one of the entry mirror and the exit mirror.

31. The microlaser cavity according to claim 29, wherein the step of forming the intracavity diaphragm forms the intracavity diaphragm to have one of a circular shape and an annular shape.

32. The microlaser cavity according to claim 29, wherein the step of forming the intracavity diaphragm forms the intracavity diaphragm so as to enable oscillation of a fundamental mode of the microlaser cavity and to prevent other oscillation modes different than the fundamental mode.

33. The microlaser cavity according to claim 29, wherein the step of forming the entry mirror form the entry mirror to have a concave shape and the step of forming the exit mirror forms the exit mirror to have a plane shape, thereby forming a plane-concave laser.

34. The microlaser cavity according to claim 29, wherein steps of forming the entry mirror and the exit mirror forms the entry mirror and the exit mirror to have a plane shape, thereby forming a plane-plane laser.

35. The microlaser cavity according to claim 29, further comprising disposing a saturable absorbent material within said microlaser cavity.

* * * * *